July 2, 1940.  J. MIHALYI  2,206,105
CAMERA SHUTTER
Filed Dec. 23, 1938  2 Sheets-Sheet 1
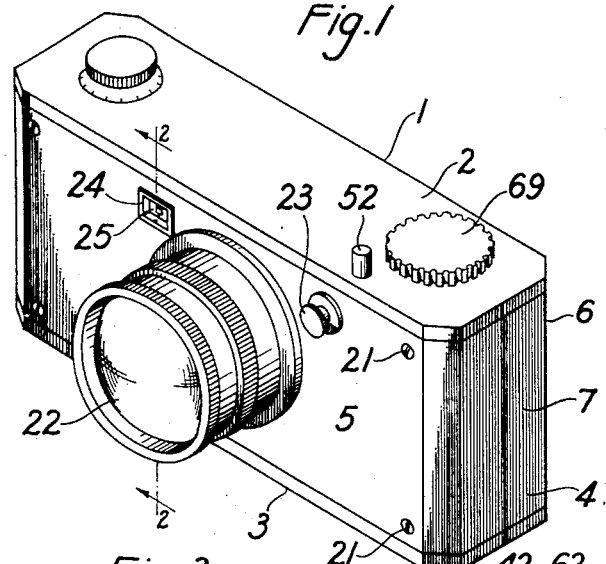
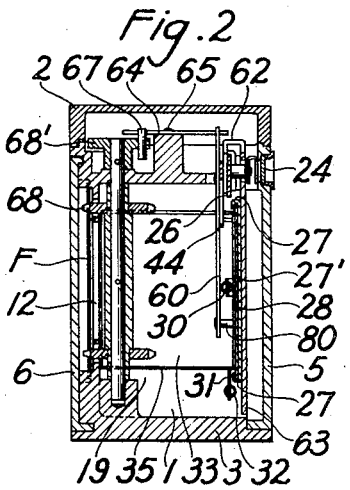
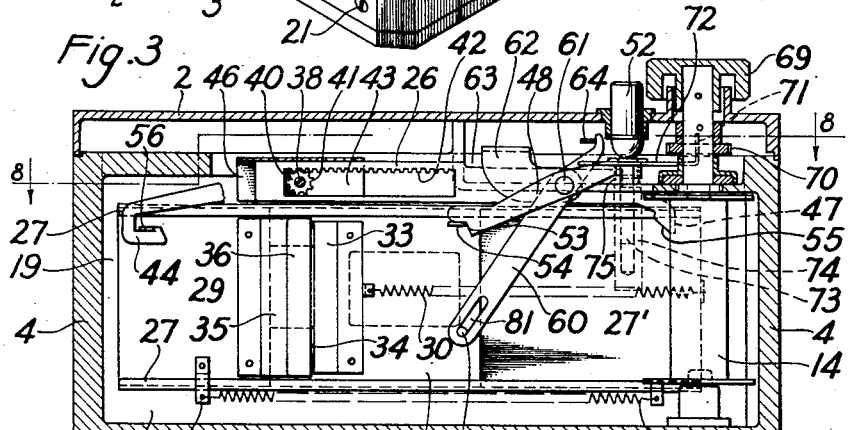
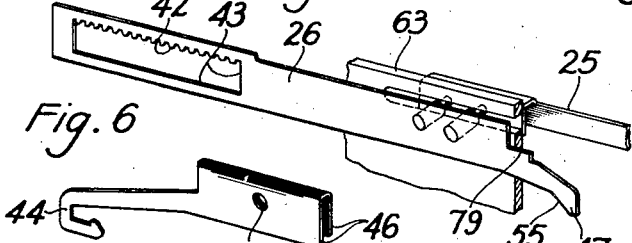
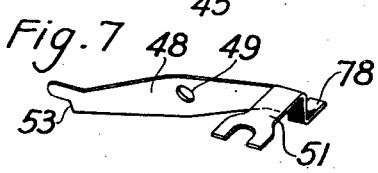
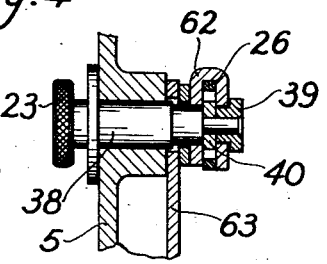
Joseph Mihalyi
INVENTOR
BY
ATTORNEYS July 2, 1940.  J. MIHALYI  2,206,105
CAMERA SHUTTER
Filed Dec. 23, 1938   2 Sheets-Sheet 2
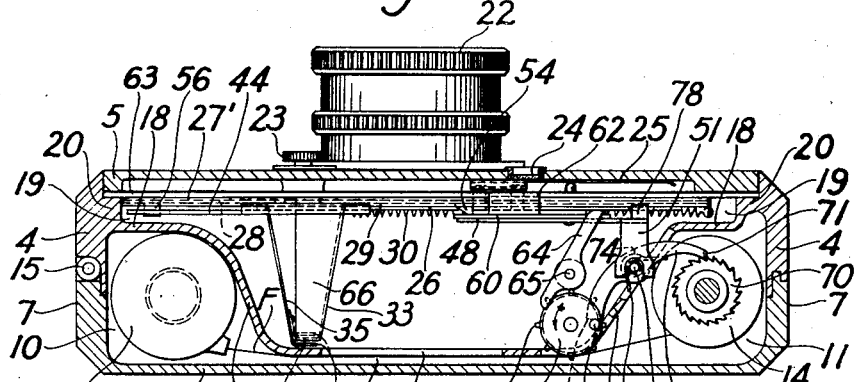
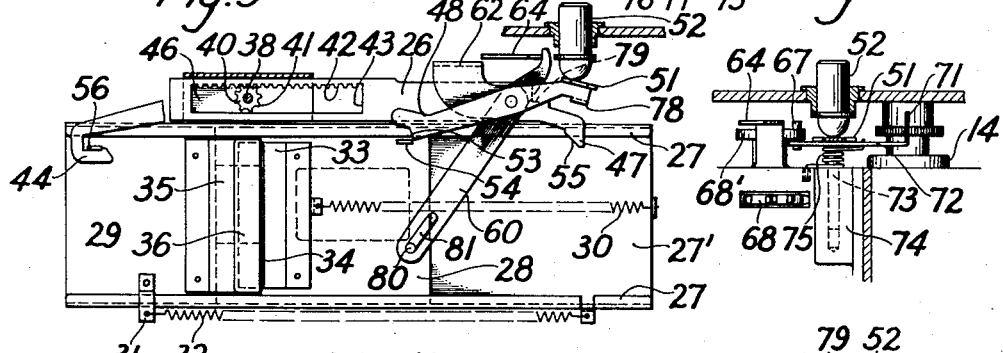
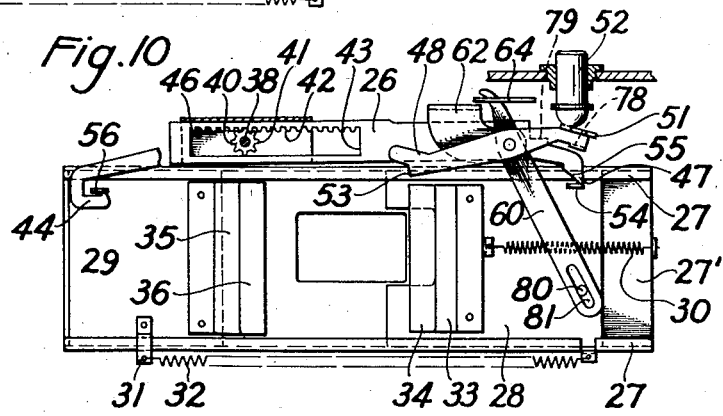
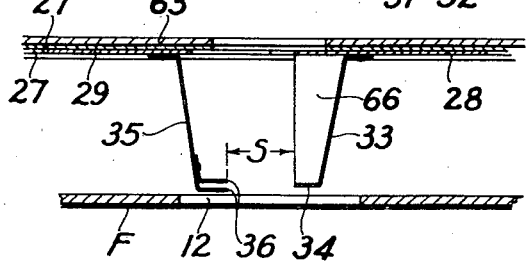
Joseph Mihalyi
INVENTOR
BY
ATTORNEYS Patented July 2, 1940

2,206,105

UNITED STATES PATENT OFFICE 2,206,105

CAMERA SHUTTER

Joseph Mihalyi, Rochester, N. Y., assignor to Eastman Kodak Company, Rochester, N. Y., a corporation of New Jersey Application December 23, 1938, Serial No. 247,423

11 Claims. (Cl. 95—55)

This invention relates to photography and more particularly to photographic cameras.

One object of my invention is to provide a camera with a built-in shutter of the focal plane variety which is comparatively simple and with which a relatively wide range of exposures can be obtained. Another object of my invention is to provide a camera of the roll holding type with a chamber extending across the front of the camera to contain the camera shutter, the shutter being provided with rearwardly extending projections which form a slot close to the exposure frame of the camera, so that the effect of a focal plane shutter is obtained. Still other objects will appear from the following specification, the novel features being particularly pointed out in the claims at the end thereof.

Coming now to the drawings wherein like reference characters denote like parts throughout:

Fig. 1 is a perspective view of a camera constructed in accordance with and embodying a preferred form of my invention.

Fig. 2 is a section taken on line 2—2 of the camera shown in Fig. 1.

Fig. 3 is a longitudinal section through the camera shown in Fig. 1 with the shutter parts shown in elevation.

Fig. 4 is an enlarged fragmentary detail through the speed control lever adjusting mechanism.

Fig. 5 is a perspective view of the speed control lever.

Fig. 6 is a similar view of the rear shutter latch.

Fig. 7 is a perspective view of the shutter tripping lever.

Fig. 8 is a longitudinal sectional view, parts being shown in elevation on line 8—8 of Fig. 3.

Fig. 9 is a fragmentary elevation showing parts of the shutter mechanism in a closed position.

Fig. 10 is a view similar to Fig. 9, but with the shutter shown in an open position.

Fig. 11 is a fragmentary detail sectional view through the shutter trigger and film latching mechanism, and Fig. 12 is a fragmentary transverse sectional view showing the relationship of the shutter parts to the exposure frame of the samera.

In the so-called miniature cameras, there is comparatively little room for the customary type of focal plane shutters in which edges of curtains or plates form a slot which crosses the exposure frame to make an exposure. Such shutters are desirable for small cameras because very rapid exposures may be made with them and because they can be readily intergeared with film winding mechanism to render the camera substantially foolproof.

In the drawings, I have illustrated a preferred form of my invention, in which the camera, as indicated in Fig. 1, may have a more or less conventional exterior comprising a casing 1, having a top wall 2, a bottom wall 3 and end walls 4. The front wall 5 extends substantially the entire length of the camera and the rear wall 6 corresponds in size and shape. In the present embodiment, the rear wall 6, together with portions 7 of the end walls 4, may form a back which may be opened to load film into the camera.

Referring particularly to Fig. 8, the camera body 1 is provided with a supply spool chamber 10 and a take-up spool chamber 11 which are spaced to each side of an exposure frame 12 so that a film F, being drawn from a supply spool or retort 13, may be drawn across the exposure frame 12 and onto a take-up spool 14 in the usual manner.

It should be noted that in this instance the camera back 6 may be swung open upon the hinge 15 for threading film into the camera. It should also be noticed that the exposure frame 12 is formed in a wall which is formed upwardly at 17 to form the spool chambers 11 and 10, and this wall, as is indicated at 18, is spaced away from the camera front 5 to form an opening or shutter chamber 19 which is substantially as long as the length of the camera, since only the extreme end walls 20 lie between the edges of this chamber and the outside walls 4 of the camera body.

This chamber is a shutter chamber, and I prefer to mount the entire shutter mechanism on the front plate 5 because this not only facilitates assembling the shutter, but it makes it a simple matter to replace or repair any part of the shutter mechanism. As is indicated in Fig. 1, the front plate may, if desired, be attached to the camera body by means of four screws 21. The front plate 5 carries an objective 22 and is provided with an adjusting knob 23 which may be turned to vary the speed of the shutter, this speed being indicated through a window 24 in the front plate which exposes a portion 25 of a speed scale which is directly carried by the speed adjusting lever 26, as will be hereinafter more fully described.

Referring to Figs. 9 to 12, inclusive, the shutter is shown in detail. The front plate 5 carries a slideway composed of pairs of spaced flanges 27 which may be carried by a base plate 27', this slideway supporting the two shutter plates 28 and 29. Plate 28 is the leading plate and plate 29 is the following plate, each one of these plates being normally moved toward the right of these figures by means of their respective springs, plate 28 being connected to the spring 30 and plate 29 being connected to a bracket 31 and spring 32. Thus, each plate may be separately slid through the guideway 27 by means of their respective springs.

While these shutter plates are mounted on the front plate of the camera 5, they nevertheless form portions of the focal plane shutter, as best shown in Fig. 12, because each plate is provided with a rearwardly formed flange member which has an edge adjacent a film F lying in the exposure frame 12.

Plate 28 is provided with a rearwardly formed member 33, the end of which, 34, is formed parallel to the exposure frame. Plate 29 is provided with a rearwardly formed plate 35 which has a pair of flanges 36 lying parallel to the film path. When the shutter plates move across the exposure frame with the flanges 36 and 34 spaced apart, the spacing S between these flanges constitute the slot, the width of which governs the exposure. Thus, when a very narrow slot is employed, a fast exposure will be obtained, and where a slow exposure is to be made, plate 28 is moved all the way across the exposure frame 12 before the following plate 29 is released.

In order to control the relative position of the two plates during an exposure, the speed control lever 26 is mounted in the manner indicated in Fig. 4 so that it may both pivot upon the front plate 5 and so that it may move longitudinally with respect thereto. The lever 26 is mounted upon a shaft 38, terminating in the speed adjusting knob 23 on the outside of the front plate 5 and terminating in a stud 39 on the inside, there being a pinion 40 carried on the shaft 38 to turn therewith. The upper teeth 41 of this pinion mesh with the internal rack 42 of the lever 26 so that when the pinion 40 is turned, the lever 26 can be moved back or forth according to the direction of movement of the handle 23 throughout its limit of motion which is the length of the slot 43. The tripping latch member 44, shown in Fig. 6, is likewise carried by the shaft 38, the end of this shaft passing through the aperture 45 which is formed in both of the U-shaped walls 46, between which the speed adjusting lever 26 is mounted. As will be evident from the above description, the latch member 44 does not move relative to the adjusting knob but provides in effect a slideway in which the lever 26 may be moved.

The lever 26 is provided with a downwardly extending nose 47. A shutter tripping lever 48, best shown in Fig. 7, is apertured at 49, this lever being mounted on a bracket 62 by means of a stud 61 passing through the apertures in the flanges of the bracket 62. This bracket, as shown in Fig. 2, is supported by the plate 63 which is carried by the front plate 5 in any suitable manner.

The lever 48 carries a flange 51 which may be engaged by the trigger member 52 passing through the top wall 2 of the camera, so that the latching member 53 may be swung away from the path of a lug 54 carried by the shutter plate 28, releasing this member and enabling the spring 30 to move it across the exposure aperture 12. As this shutter plate moves across, the lug 54 comes opposite to the nose 47 on lever 26 and when it strikes the cam surface 55 of this member, it rocks the lever 26 about its pivot 38, thereby lowering the tripping latch 44 so that this latch will release the lug 56 on the shutter plate 29 and permit its spring 32 to slide it through the slideway 27 and across the exposure frame 12.

The time of the exposure, as above explained, depends on the width of the slot between the exposure edges 34 and 36, and consequently, on the length of travel of the shutter plate 28 before the shutter plate 29 is released. The length of this travel can, of course, be altered by the position of the cam 55, so that by turning the pinion 40, the rack 42 will adjust the lever to the desired setting. This setting can be readily determined from the outside of the camera because of the window 24, the scale 25 being graduated into units of speed which are brought opposite the window for the different adjustments by adjusting lever 26 carrying the scale plate on studs 25 as best shown in Fig. 5.

In order to set the shutter, that is, to move the plates to the left to the Fig. 8 position, the following arrangement is used: Lever 60 is pivoted upon the stud 61 which is carried by a bracket 62 formed over from the top of a plate 63, as best shown in Fig. 2. The stud 61 likewise supports the trip lever 48 and passes through the aperture 49. When this lever is turned upon its stud by means of a second lever 64, pivotally mounted at 65, it moves from the position shown in Fig. 10 to the position shown in Fig. 9. This movement moves both plates together until plate 29 is latched through the engagement of lug 56 and latch 44 and plate 28 is latched through the engagement of lug 54 and the tripping lever 48. During this movement, the flange 34 of plate 28 lies between the two flanges 36 of plate 29 and these walls, together with edge walls 66, form a light-tight closure which prevents any of the light from passing through the exposure aperture 12.

The lever 64 is swung about its pivot 65 by means of a stud 67 extending upwardly from a disk 68' attached to the shaft carrying sprocket 68, this sprocket being turned when the film is wound by means of a winding key 69 on the outside of the camera, which turns the take-up spool 14. Thus, as a fresh area of film is advanced, the sprocket moves one revolution and swings the lever 64 about the pin 65, at the same time swinging the lever 60 to set the shutter plates.

This movement can only be accomplished after an exposure has been made because the depression of the trigger member 52 is necessary to unlatch the film winding mechanism, best shown in Figs. 8 and 11.

As indicated in these figures, the take-up spool 14 carries a fine toothed ratchet 70 which may be engaged by an upturned lug 71 on a lever 72 pivotally mounted upon a stud 73 which is free to turn and slide axially in its bearings 74, a spring 75 normally holding the lever 72 in the position shown in Fig. 11. In this position, one end 76 of the lever 72 may engage one end of the pin 67 carried by the sprocket 68 and prevent movement of the sprocket, as well as movement of the film. However, when the trigger 52 is depressed to make an exposure, the shaft 73 moves downwardly in its bearing 74, releasing the end 76 of the lever from the pin 67 and permitting the spring 75 to swing the lever so that the upturned end 71 will move away from the ratchet. In this position, when the trigger is released, the end 76 of the lever comes up beneath the end of the pin 67, and consequently, the film winding mechanism is unlocked.

The winding knob 69 can now be turned, the pin 67 riding idly away from the locking end 76 of the lever until it is brought to a stop by this lever when the parts reach the position shown in Fig. 8. This movement immediately rocks lever 72 so that the flange 71, by again engaging the ratchet wheel 70, will prevent further winding. At this time, the shutter plates 28 and 29 have been moved to their Fig. 9 position, in which they are set, latched and ready for an exposure.

It will thus be seen that with the structure shown in the drawings, it is only possible to make an exposure after the film has been wound, and it is only possible to set the shutter through the winding of the film. Thus, it is impossible to make double exposures.

I have provided a means for making a prolonged or so-called bulb exposure, and this occurs when the parts are in the position shown in Figs. 1 and 3, in which the formed up end 78 of lever 48 is so positioned that by depressing the trigger member 52 the end 78 lies in the notched portion 79 of the lever 26 and consequently prevents the lug 54 from camming up the end 55 of lever 26, thereby releasing the second shutter member. As long as the lug 78 is held in the notch 79, the shutter will remain in an open position, but when the trigger 52 is released, as soon as the lug 78 moves out of the notch 79, the lug 54 of the shutter will cam lever 26 about its fulcrum, thus releasing the second shutter member 29 to complete the exposure.

It should be particularly noticed that with the camera above described, there is a shutter chamber extending entirely across the front of the camera so that portions of this chamber 19 extend over the ends of the spool chambers 10 and 11, and portions extend across the front of the exposure frame 12. Thus, the shutter chamber is substantially as long as the camera and lies parallel to and immediately behind the front plate 5. However, in spite of the fact that the shutter is carried by the front wall of the camera, the exposure slit is formed adjacent the film, lying on the exposure frame so that the shutter is, in fact, a focal plane shutter and its efficiency is thereby increased. This structure has the additional advantage that the shutter mechanism can be assembled on the front plate which can be easily attached and detached to the camera body.

The operation of my camera is extremely simple. In order to make an exposure, the knob 23 is moved until the desired speed graduation appears in the window 24. As the knob 23 is turned, the pinion 40 engages the internal rack 42 to shift tripping lever 26. The trigger 52 is then depressed, lifting the latch member 53 from lug 54 and permitting spring 30 to rapidly move shutter leaf 28 through the slideway. As soon as the lug 54 reaches the cam 55 on the tripping lever 26, it is rocked upon its pivot 38 lowering the latch 44, thereby releasing the lug 56 so that the shutter leaf 29 may slide through the slideway under the impulse of spring 32.

Thus, the first shutter leaf opens the exposure aperture and the second shutter leaf closes it. When the two leaves are adjusted so that leaf 28 travels a very short distance before leaf 29 is permitted to move, a very rapid exposure may be accomplished.

After making an exposure, if an operator should depress the trigger 52, nothing would happen unless the film had been wound. After depressing the lever 52, the ratchet wheel 70 is released by the flange 71 and the pin 67 is likewise released. The knob 69 may then be used to wind film until the sprocket 68, turning in the direction shown by the arrow in Fig. 8, again strikes the end of lever 72, thus stopping the winding movement by throwing the flange 71 and ratchet wheel 70 into engagement. Meanwhile, during the winding operation, the pin 67 has swung the lever 64 about its pivot 65 and at the same time has swung the lever 60 about its pivot, so that the pin 80, carried by the shutter leaf 28, which engages the slot 81 in lever 60, will bring the shutter leaves into their set position.

What I claim is:

1. In a camera, the combination with a camera body member, of spool chambers at each end thereof, an exposure frame between the spool chambers, a camera back covering the exposure frame and at least parts of the spool chambers, and a front plate extending across the major portion of the camera front, said front plate being spaced from the spool chambers providing an elongated opening between the front plate and spool chambers, a shutter chamber substantially as long as the camera extending across the camera between the front plate, spool chambers and exposure frame, a shutter assembly including leaves carried thereby, and extensions carried by the shutter leaves extending rearwardly therefrom and including edges lying adjacent the exposure frame constituting a focal plane shutter.

2. In a camera, the combination with a camera body member, of spool chambers at each end thereof, an exposure frame between the spool chambers, a camera back covering the exposure frame and at least parts of the spool chambers, and a front plate extending across the major portion of the camera front, said front plate being spaced from the spool chambers providing an elongated opening between the front plate and spool chambers, a shutter chamber substantially as long as the camera extending across the camera between the front plate, spool chambers and exposure frame, a shutter assembly including leaves mounted in the chamber, the shutter leaves including offset portions extending from the front shutter chamber toward the exposure chamber and ending adjacent thereto, whereby the exposure of film may be controlled by the edges adjacent the film through movement of the shutter members in the shutter chamber spaced from the film.

3. In a camera, the combination with a camera body member, of spool chambers at each end thereof, an exposure frame between the spool chambers, a camera back covering the exposure frame and at least parts of the spool chambers, and a front plate extending across the major portion of the camera front, said front plate being spaced from the spool chambers providing an elongated opening between the front plate and spool chambers, a shutter chamber substantially as long as the camera extending across the camera between the front plate, spool chambers and exposure frame, a shutter assembly including leaves carried thereby, and extensions carried by the shutter leaves extending rearwardly therefrom and including edges lying adjacent the exposure frame constituting a focal plane shutter, the entire shutter assembly being attached to the front plate.

4. In a camera, the combination with a camera body member, of spool chambers at each end thereof, an exposure frame between the spool chambers, a camera back covering the exposure frame and at least parts of the spool chambers, and a front plate extending across the major portion of the camera front, said front plate being spaced from the spool chambers providing an elongated opening between the front plate and spool chambers, a shutter chamber substantially as long as the camera extending across the camera between the front plate, spool chambers and exposure frame, a shutter assembly including leaves carried thereby, and extensions carried by the shutter leaves extending rearwardly therefrom and including edges lying adjacent the exposure frame constituting a focal plane shutter, the entire shutter assembly being attached to the front plate and extending approximately throughout the length thereof.

5. In a camera, the combination with a camera body member, of spool chambers at each end thereof, an exposure frame between the spool chambers, a camera back covering the exposure frame and at least parts of the spool chambers, and a front plate extending across the major portion of the camera front, said front plate being spaced from the spool chambers providing an elongated opening between the front plate and spool chambers, a shutter chamber substantially as long as the camera extending across the camera between the front plate, spool chambers and exposure frame, a shutter assembly including leaves mounted in the chamber, the shutter leaves including offset portions extending from the front shutter chamber toward the exposure chamber and ending adjacent thereto, whereby the exposure of film may be controlled by the edges adjacent the film through movement of the shutter members in the shutter chamber spaced from the film, means for limiting the movement of the shutter blades to such an extent that said offset leaf portions are limited to movement between said spool chambers.

6. In a camera, the combination with a camera body member, of spool chambers at each end thereof, an exposure frame between the spool chambers, a camera back covering the exposure frame and at least parts of the spool chambers, and a front plate extending across the major portion of the camera front, said front plate being spaced from the spool chambers providing an elongated opening between the front plate and spool chambers, a shutter chamber substantially as long as the camera extending across the camera between the front plate, spool chambers and exposure frame, a shutter assembly including leaves, a slideway for the leaves carried by the front plate and extending substantially across the entire front plate, offset portions of each leaf extending from the guideway between the spool chambers and adjacent the exposure frame.

7. In a camera, the combination with a camera body member, of spool chambers at each end thereof, an exposure frame between the spool chambers, a camera back covering the exposure frame and at least parts of the spool chambers, and a front plate extending across the major portion of the camera front, said front plate being spaced from the spool chambers providing an elongated opening between the front plate and spool chambers, a shutter chamber substantially as long as the camera extending across the camera between the front plate, spool chambers and exposure frame, a shutter assembly including leaves, a slideway for the leaves carried by the front plate and extending substantially across the entire front plate, offset portions of each leaf extending from the guideway between the spool chambers and adjacent the exposure frame, and mechanism carried by the front plate for differentially moving the shutter leaves to make an exposure between the leaf edges adjacent the exposure frame.

8. In a camera, the combination with a camera body member, of spool chambers at each end thereof, an exposure frame between the spool chambers, a camera back covering the exposure frame and at least parts of the spool chambers, and a front plate extending across the major portion of the camera front, said front plate being spaced from the spool chambers providing an elongated opening between the front plate and spool chambers, a shutter chamber substantially as long as the camera extending across the camera between the front plate, spool chambers and exposure frame, a shutter assembly including leaves, a slideways for the leaves carried by the front plate and extending substantially across the entire front plate, offset portions of each leaf extending from the guideway between the spool chambers and adjacent the exposure frame, and mechanism carried by the front plate for differentially moving the shutter leaves to make an exposure between the leaf edges adjacent the exposure frame, said mechanism including a speed control lever pivotally mounted on the camera front and adapted to hold a shutter leaf against movement, said trip lever and pivot also including a rack and pinion for bodily shifting the lever on its pivot.

9. In a camera, the combination with a camera body, of an exposure frame, spool chambers mounted at each end thereof, a front plate covering the front of the camera body, a shutter assembly mounted thereon, said shutter assembly including a slideway, a pair of spaced apertured leaves mounted in the slideway, offset portions on each leaf extending from the leaf between the spool chambers and adjacent to the exposure frame, springs for moving the leaves in one direction, a speed control lever pivotally mounted on the front plate, means for sliding the control lever on its pivot, the lever and shutter blades being so arranged that movement of one blade may rock the lever on its pivot for releasing the other blade.

10. In a camera, the combination with a camera body, of an exposure frame, spool chambers mounted at each end thereof, a front plate covering the front of the camera body, a shutter assembly mounted thereon, said shutter assembly including a slideway, a pair of spaced apertured leaves mounted in the slideway, offset portions on each leaf extending from the leaf between the spool chambers and adjacent to the exposure frame, springs for moving the leaves in one direction, a speed control lever pivotally mounted on the front plate, means for sliding the control lever on its pivot, the lever and shutter blades being so arranged that movement of one blade may rock the lever on its pivot for releasing the other blade, a window in the front plate, speed graduations carried by said pivoted lever and readable through the window for indicating the setting of the lever.

11. In a camera, the combination with a camera body, of an exposure frame, spool chambers mounted at each end thereof, a front plate covering the front of the camera body, a shutter assembly mounted thereon, said shutter assembly including a slideway, offset portions on each leaf extending from the leaf between the spool chambers and adjacent to the exposure frame, a pair of spaced apertured leaves mounted in the slideway, springs for moving the leaves in one direction, a speed control lever pivotally mounted on the front plate, means for sliding the control lever on its pivot, the lever and shutter blades being so arranged that movement of one blade may rock the lever on its pivot for releasing the other blade, said means for sliding the control lever comprising a rack carried by the control lever, a pinion engaging the rack and carried by a shaft passing through the front plate, and means on the outside of the front plate for turning the shaft.

JOSEPH MIHALYI.